Aug. 10, 1948.　　　　A. F. ECKEL　　　　2,446,696
DECIMAL POINT LOCATOR FOR SLIDE RULES
Filed Aug. 29, 1946　　　　2 Sheets-Sheet 1
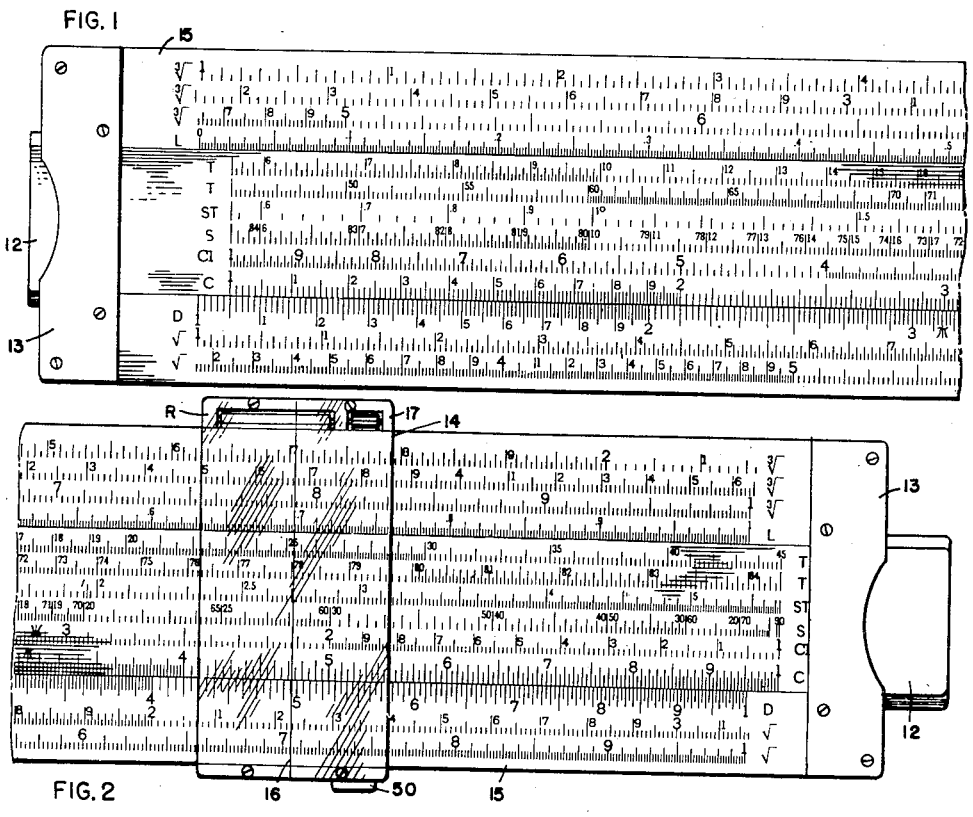
INVENTOR.
ARTHUR F. ECKEL
BY
ATT'YS Aug. 10, 1948.  A. F. ECKEL  2,446,696
DECIMAL POINT LOCATOR FOR SLIDE RULES
Filed Aug. 29, 1946  2 Sheets-Sheet 2
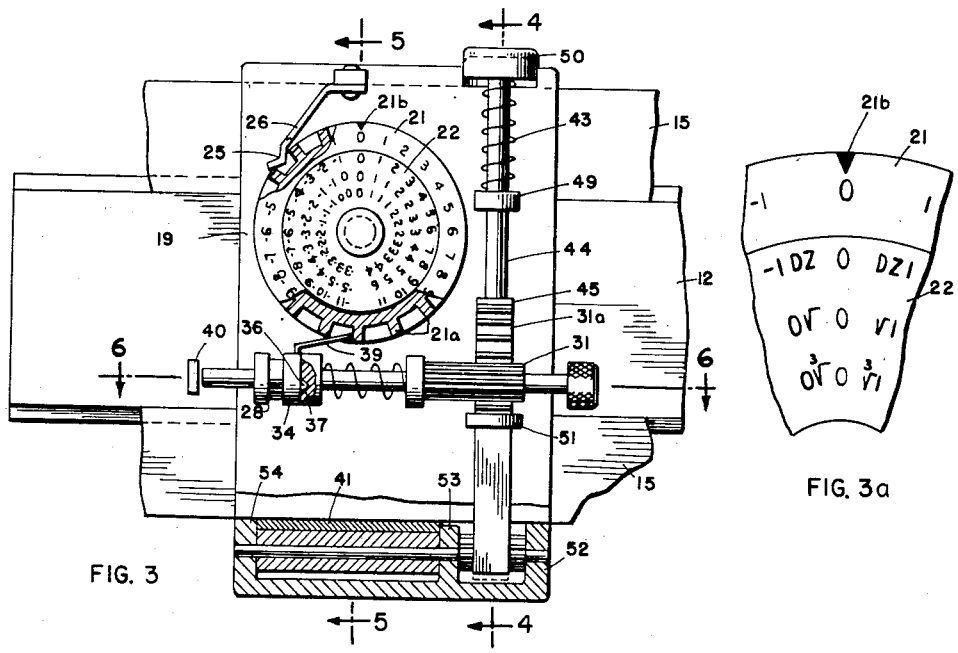
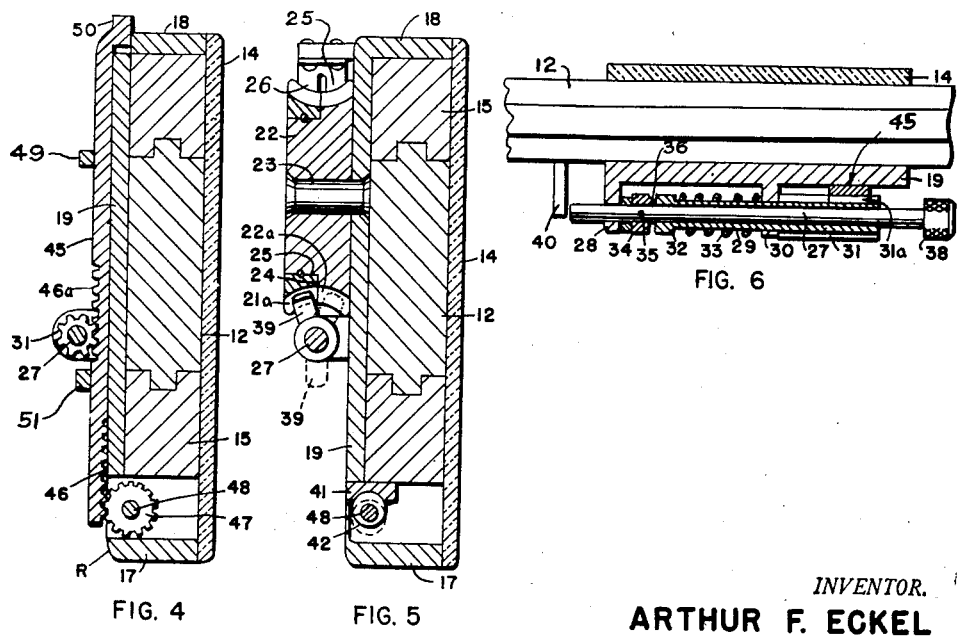
INVENTOR.
ARTHUR F. ECKEL
BY
*Bair & Freeman*
ATT'YS Patented Aug. 10, 1948

2,446,696

UNITED STATES PATENT OFFICE 2,446,696

DECIMAL POINT LOCATOR FOR SLIDE RULES

Arthur Frederick Eckel, Chicago, Ill., assignor to Myrtle Scott Eckel, Chicago, Ill., and Louise Wickersham Pickett, La Grange, Ill.

Application August 29, 1946, Serial No. 693,612

10 Claims. (Cl. 235—64.3)

This invention relates to a decimal point locator mounted on the cursor of a slide rule and including a pair of dials that indicate the location of the decimal point when the relative position of the dials is used in conjunction with the formula: $(D_n - Z_n) - (D_d - Z_d)$ wherein $D_n$ and $D_d$ designate for the answer the total number of digits to the left of the decimal point for those numbers greater than 1 in the numerator and denominator, respectively, and $Z_n$ and $Z_d$ designate the total number of zeros to the right of the decimal point in said numerator and denominator. In straight multiplication the formula is still simpler, being merely $D-Z$.

This application is a continuation-in-part of my application, Serial No. 595,533, filed May 24, 1945, now abandoned.

One object of the invention is to provide the decimal point indicating dials mechanically operable one scale division in one direction by means of the slide of the rule whenever the left C index thereof approaches the hair line of the cursor, and operable in an opposite direction one scale division whenever the cursor is moved to a position with its hair line coincident with the left C index, whereby problems in both multiplication and division or any combination of the two results in a counting of the factors and the number and direction of off-scale answers on the decimal indicating dials. This positions the dials in relation to each other so that by counting the digits and zeros in the problem, and determining for them the answer to the formula $(D_n-Z_n)-(D_d-Z_d)$ the decimal point location can be read from the dials.

Another object is to provide the decimal indicating dials with square root and cube root scales so that the decimal point can be located in problems involving square root and cube root as well as in those involving first powers of numbers.

A further object is to provide the dial actuating mechanism with a clutch to render the mechanism inoperable to operate the dials when the reciprocal or CI scale of the rule is used during problems in division, thereby keeping the dials in step with the slide rule manipulations.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an enlarged front elevation of a straight slide rule to which my invention is applied, this figure showing the left half only of the rule.

Figure 2 is a similar front elevation showing the right half of the rule and a front view of the cursor thereon, Figure 2 being a continuation of the right hand end of Figure 1.

Figure 3 is an enlarged view of the reverse side of the slide rule and the cursor constructed to include my indicating dials and the operating mechanism therefor, portions of the cursor being broken away and other portions shown in section to illustrate details of construction.

Figure 3a is an enlargement of a portion of Figure 3.

Figure 4 is a vertical sectional view on the line 4—4 of Figure 3.

Figure 5 is a vertical sectional view on the line 5—5 of Figure 3.

Figure 6 is a horizontal sectional view on the line 6—6 of Figure 3.

On the accompanying drawings I have used the reference numeral 15 to indicate the stator of a slide rule, the stator being formed of two bars connected together at their ends by cross pieces 13. Slidable between the stator bars 15 is a slide 12 and slidably surrounding the stator and slide is a cursor R. The cursor R has a transparent front panel 14 provided with the usual hair line 16 for indicating purposes.

The cursor R has a back wall 19, an upper wall 17 and a lower wall 18. In Figures 3, 4 and 5 the rule has been turned top for bottom as this is the natural way of turning it during manipulations for the solving of problems and for observing the relative positions of the decimal point indicating dials on the back as in Figure 3. Accordingly, the wall 17 is at the bottom of these three figures and the wall 18 is at the top. The wall 19 is adapted for mounting a pair of decimal indicating dials 21 and 22 and the operating mechanism therefor as will be later described.

Referring to the front of the slide rule as shown in Figures 1 and 2 there is a succession of scales from top to bottom thereof. The first four scales are on the stator 15, three of them being cube root scales indicated $\sqrt[3]{}$. These may be referred to as the upper, middle and lower cube root scales without the necessity of applying reference numerals to them. The fourth scale is a log scale indicated as L.

The next five scales are on the slide 12 and may be classified as follows: The upper T scale (indicated T) is the tangent scale of angles between 5.7° and 45°. The lower T scale (also indicated T) is used on angles between 45° and 84.3°. The third scale (ST) on the slide is for sines and tangents of small angles. The fourth scale (S) is for sines of angles between 5.73° and 90°. The fifth scale is the regular reciprocal scale (CI, indicating C scale inverted) of an ordinary slide rule and the sixth scale is the regular C scale thereof, these two last scales being used in division and multiplication computations.

The next scale or the first scale on the lower bar of the stator 15 is the ordinary D scale used in multiplication and division computations. Below the D scale are an upper square root scale ($\sqrt{}$) and a lower square root scale (also indicated $\sqrt{}$). These will be hereinafter referred to as the upper $\sqrt{}$ scale and the lower $\sqrt{}$ scale.

Referring now to the construction of the decimal point indicating dials 21 and 22, the inner dial 22 is mounted on a stud 23 extending from the cursor wall 19 as shown in Figure 5. The outer dial 21 is rotatable around a shoulder portion 24 of the dial 22 and both dials are normally retained in indexed positions by means of springs 25 and 26, respectively.

For rotating the dials 21 and 22 I provide a shaft 27 which is slidable and rotatable in a bearing 28 extending from the wall 19 and in a sleeve 29 which in turn is rotatable and slidable in a second bearing 30 extending from the wall 19. The sleeve 29 has pinion teeth 31 thereon at one end and a collar 32 at the other end. A spring 33 is interposed between the bearing 30 and the collar 32.

The shaft 27 is provided with a collar 34 secured thereto as by a pin 35 and the collar is provided with a clutch point 36. The collar 32 of the sleeve 29 is provided with a clutch depression 37 adapted to normally receive the clutch point 36 as in Figure 3. The shaft 27 may however be slid to the left and then rotated by means of the knurled knob 38 so that the clutch point 36 is out of the clutch depression 37 as shown in Figure 6.

The pawl 39 is a leaf spring whereby it will index either dial 21 or 22 one scale division counter-clockwise in Figure 3 when the shaft 27 is pushed toward the right by means of a lug 40, the final position of the lug after indexing the dial being against the left side of the cursor wall 19 when the left C index is under the hair line 16. The shaft 27 may slide in a left hand direction without indexing the dials when the lug 40 moves toward the left.

The cursor R is normally locked in relation to the stator 15. This is accomplished by means of a friction shoe 41 with which an eccentric 42 engages, the eccentric being constrained to the solid line position of Figure 5 by a spring 43. The spring 43 is located on a rod 44 connected with a rack bar 45 having rack teeth 46 meshing with a pinion 47. The pinion 47 is secured to a shaft 48 on which the eccentric 42 is mounted.

The spring 43 is interposed between a slide bearing 49 for the rod 44 and a push button 50 which is mounted on the rod 44 and serves as a lock release when depressed to the dotted position of Figure 3. When so depressed the shaft 48 is rotated and the eccentric 42 assumes the dotted position of Figure 5. A slide bearing 51 is provided for the rack bar 45 and the shaft 48 is journalled in bearings 52, 53 and 54 of the cursor R.

The rack bar 45 also has teeth 46a meshing with the pinion teeth 31 of the sleeve 29.

*Practical operation*

In my copending applications, Serial No. 578,157, filed February 16, 1945 and Serial No. 620,506, filed October 5, 1945 now Patent No. 2,426,601, granted Sept. 2, 1947, I disclosed methods and mechanism for determining the location of the decimal point in a computation using the following formula in conjunction with a means to indicate the number of times the answer goes off scale on the slide rule and the direction that it goes off scale:

$$D_n - (F_n + Z_n) - D_d - (F_d + Z_d) - 1$$

This formula is more complicated than the formula $$(D_n - Z_n) - (D_d - Z_d)$$

used in connection with the present invention as it includes factors ($F_n$ for factors in the numerator and $F_d$ for factors in the denominator) and −1. It was necessary in connection with the devices in those two applications to count the factors in the computation, whereas with the present invention only digits and zeros need be counted, the dial actuating means being automatically operable to perform the factor counting operation as the computations are worked out on the slide rule.

When numbers are greater than 1 the number of digits to the left of the decimal point are counted, whereas when numbers are less than 1 the number of zeros to the right of the decimal point are counted. The digits may be referred to as plus numbers and the zeros as minus numbers and the divisions of the dials 21 and 22 are numbered accordingly. By way of example the number 734.05 has three digits and the number .00465 has two zeros. The number .856 has no digits and no zeros and is indicated (0) on the dials. On the dial 21, it will be noted that there is an arrow head 21b at the zero to indicate the starting point in connection with decimal point location.

Probably the best way to explain how the dials 21 and 22 are operated is to outline a few simple examples. Starting with the example:

$$3 \times 2 = 6$$

The operator rotates the dial 21 until its zero or the arrow head 21b is opposite the zero of the dial 22 at the start of each computation. The slide rule is then manipulated, beginning with the left C index over the left D index, by first moving the hair line 16 to 3 on the D scale. By now moving the left C index to a position under the hair line 16, the 2 on the C scale will move to 6 on the D scale and 6 is the answer. We, of course, know that this answer is 6 and not 60 or .6, but in more complicated problems the position of the decimal point is not so obvious.

The decimal point in the problem under consideration is located in the following manner: The movement of the left C index to a position under the hair line causes the lug 40 to engage the left end of the shaft 27 thus moving the shaft toward the right and causing the pawl 39 to advance the dial 21 counter-clockwise one scale division. This places the arrow head 21b of the dial over the zero of the dial 22 indicating a —1. Digits minus zeros in this computation is equal to 2—0 or 2 and by then subtracting 1 (the —1 of the dial 22 under the arrow head 21b of the dial 21) the result is +1 indicating one digit in the answer.

If the problem were $$30 \times 2$$

the answer would be 60 and this is determined by first calculating $$D-Z=3-0=3$$

and then subtracting the —1 of the dial 22 from the above 3. The answer is 2 digits, thereby indicating that the answer 6 to the computation $30 \times 2$ is 60 and not 6 or 600, etc. Likewise in the problem $$.3 \times 2 = .6$$
$$D-Z=1-0=1$$

We therefore subtract 1 from the above 1 because the dial 22 indicates —1, and no digits and likewise no zeros are indicated so that the answer is .6.

In multiplying $$2 \times 2 \times 2$$

the hair line is brought to 2 on the D scale and when the left C index is brought up to match it the dial 21 will be actuated counter-clockwise so that the arrow head 21b is opposite the —1 on the dial 22. The hair line is then advanced to 2 on the C scale and when the left index of the C scale is brought up to the hair line the dial 21 is again advanced so that the recording is then —2. Under 2 on the C scale the answer 8 is read on the D scale. The number of digits is determined by $$D-Z \text{ is } 3-0=3$$

By then subtracting the —2 on the dial 22 we get an answer of 1 indicating one digit so that the answer 8 is a one digit answer and not a two digit answer 80, a no-digit answer 8 or a one zero answer .08.

It is obvious from the foregoing examples that the number of factors are automatically taken care of, as in $$3 \times 2$$

we have a one digit answer, and likewise in $$2 \times 2 \times 2$$

a one digit answer. Although there are three factors instead of two the three factors resulted in two operations of the dial 21, whereas the two factors resulted in only one operation thereof thus changing the position of the dial 22 in reference to the arrow head 21b to take care of factors so that digits and zeros only need be counted for determining the decimal point in conjunction with the dials 21 and 22. One further example is believed in order and that is a case where the answer goes off scale such as in the problem $$3 \times 4 = 12$$

In this case with the hair line over the 3 of the D scale advancement of the left C index to the hair line indicates that the 4 on the C scale will fall off scale and therefore the operator must not advance the left C index to the hair line or the dial 21 will be operated improperly. Instead, as soon as he sees that the answer will be off scale he reverses the slide before it actuates the dial 21, sliding it to the left until the right C index is under the hair line. The answer is then read 12 on the D scale under 4 of the C scale. In this case $$D-Z=2-0=2$$

Since there has been no actuation of either the dial 21 or the dial 22, zero on the dial 22 will be under the arrow head 21b thus indicating that nothing is to be added or subtracted relative to the $D-Z$ answer of 2. Accordingly, there are two digits in the answer.

In the problems of division such as $$\frac{2}{3} = .666$$

the hair line is moved over 2 on the D scale and 3 of the C scale is moved to a position coincident therewith. The answer is then read on the D scale under the right index of the C scale, the hair line (for uniformity in operation) being brought up to this position to obtain the reading.

In this case $$(D_n - Z_n) - (D_d - Z_d)$$

may be worked out as follows:

$$(1-0)-(1-0)=0$$

Since there have been no operations of the dials 21 and 22 there are no digits and no zeros in the answer so that we know it is .666.

In the problem $$\frac{3}{2} = 1.5$$

there must be operation of the dials to indicate one digit in the answer. The formula $$(D_n - Z_n) - (D_d - Z_d)$$

produces zero the same as in the example $$\frac{2}{3}$$

so that whatever the dial 22 indicates under the arrow head 21b will be the number of digits in the answer. In working the problem the hair line over 3 on the D scale is followed by moving 2 of the C scale under the hair line so that the answer of 15 can be read on the D scale under the left index of the C scale. It is important however to move the cursor until the hair line is over the answer at the left index of the C scale, this being the uniformity in operation hereinbefore mentioned. This assures accuracy because in so doing the unlocking of the cursor by the push button 50 also moves the pawl 39 to the dotted position of Figure 5 and approach of the shaft 27 carried by the cursor and contact of its left end with the lug 40 then slides the shaft to the right in relation to the cursor thus indexing the dial 22 instead of the dial 21 counter-clockwise so that the arrow head 21b of the dial 21 is over +1 of the dial 22. This +1 indicates one digit in the answer since $$(D_n - Z_n) - (D_d - Z_d) = 0$$

or the answer is 1.5.

Having described several examples it is believed obvious that my mechanism is correctly operable for all examples in multiplication and division or any combination of the two. Whenever the left C index is brought to a position in register with the hair line 16 the dial 21 is indexed in one direction for subtracting numbers on the dial 22 under the arrow head of the dial 21, which occurs particularly in multiplication. Whenever the cursor is unlocked and moved toward the left until the hair line matches the left index of the C scale the dial 22 is the one that is indexed, and in the same direction, thus indicating addition rather than subtraction of numbers on dial 22 in reference to the arrow head and depending on the number of times the hair line is brought to the left index of the C scale. This occurs particularly in division, whereas either indexing operation may occur at any time in combination problems depending upon the way they are worked out on the slide rule.

In those problems involving square roots and cube roots, the $\sqrt{}$ and $\sqrt[3]{}$ scales on the front of the rule are used and instead of reading the outer row of decimal indicating indicia on the dial 22, the appropriate $\sqrt{}$ or $\sqrt[3]{}$ numbers are read.

Instead of using the C and D scales in division, where there is a reciprocal scale (CI) users of slide rules usually prefer to use this scale as it is simpler in operation. When shifting from the C scale to the CI scale during the course of a computation there will be undesirable operation of the dials 21 and 22 when the left C index and the hair line of the cursor are relatively registered unless the reciprocations of the shaft 27 due to engagement by the lug 40 are prevented. This is readily done by twisting the knob 38 counter-clockwise which causes the clutch point 36 to ride out of the depression 37 and the actuating pawl 39 to assume a position out of register with the teeth 21a of the dial 21. Thereafter the lug 40 may slide the shaft 27 endwise and the shaft may be rotated by the rack teeth 46a and the pinion 31 without producing any effect on either of the dials 21 or 22. When returning to the use of the C and D scales, the knob 38 is twisted clockwise until the point 36 "clicks" into the depression 37.

While I have described my decimal point locator in connection with a straight slide rule, it is also adaptable to the circular type and my claims are to be construed as not limited to a straight rule only but applicable also to the circular type. Provision of course has to be made in the circular rule for additional actuation of the dials 21 and 22 to prevent or compensate for false actuations due to the continuous character of the stator and slide although these additions do not prevent readability of the claims on the circular rule, considering the "left" index of the slide in the claims as being the only index of the slide on the circular rule.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A decimal point locator for a slide rule comprising a pair of dials rotatably mounted on the cursor of the slide rule, said dials having indicia representing units of circumferential movement, an element slidable on the cursor, a pawl carried thereby for effecting rotation of either of said dials in one direction, said pawl normally coacting with one of said dials, said element being engageable by the slide of the rule as the left index thereof registers with the hair line of the cursor for actuating said pawl, a lock carried by said cursor for locking the cursor relative to the stator of the slide rule, means to unlock said cursor when it is desired to move the cursor relative to the stator, and means operable by said last means for shifting said actuating pawl from normal position to another position coacting with the other of said dials.

2. A decimal point locator for a slide rule comprising a pair of dials rotatably mounted on the cursor of the slide rule, said dials having indicia representing units of circumferential movement, an element slidable on the cursor of the slide rule, a pawl carried thereby for effecting rotation of either of said dials in one direction, said element being engageable by the slide of the rule as the left index thereof registers with the hair line of the cursor for actuating said pawl, and means carried by said cursor and operable when the cursor is grasped for moving it relative to the stator and slide of the rule for shifting said actuating pawl from normal position to another position coacting with the other of said dials.

3. A decimal point locator for a slide rule comprising a pair of dials rotatably mounted on the cursor of the slide rule, one of said dials having indicia representing units of circumferential movement and the other having a pointer to coact with said indicia for indicating purposes, an element carried on the cursor, a pawl to be actuated thereby for effecting rotation of either of said dials in one direction, said element being engaged by the slide as the left index thereof registers with the hair line of the cursor for actuating said pawl and thereby one of said dials normally in one direction, means on said cursor to be engaged by the operator when it is desired to move the cursor relative to the stator, and means operable by said last means for shifting said actuating pawl from normal position to another position coacting with the other of said dials.

4. In a slide rule of the character disclosed, a stator, a slide, a cursor, and a decimal point locator mounted on said cursor and comprising a pair of dials, actuating means for said dials comprising a ratchet and pawl mechanism wherein the pawl normally coacts with one of said dials and at times coacts with the other dial, means for moving the pawl comprising a projection from the slide adjacent the left index thereof whereby the pawl is actuated only when the left index registers with the hair line of the cursor due to movement of the slide, or the hair line registers with the left index of the slide due to movement of the cursor, and means operable by grasping the rider to reverse said pawl from its normal position to its position coacting with said other dial.

5. In a slide rule, a stator, a slide, a cursor, and a decimal point locator mounted on said cursor, said decimal point locator comprising a pair of dials, and actuating means for said dials comprising a ratchet and pawl mechanism wherein the pawl normally assumes one position coacting with one of the dials and at times assumes another position coacting with the other dial, means for moving the pawl comprising a projection from the slide adjacent the left index thereof whereby the pawl is actuated only when the left index registers with the hair line due to movement of the slide, or the hair line registers with the left index of the slide due to movement of the cursor, and means operable by grasping the cursor to reverse said pawl from its normal position to its second mentioned position.

6. A slide rule comprising a stator, a slide, a cursor and a decimal point locator mounted on said cursor, said locator having a pair of dials, and actuating means for said dials comprising a ratchet and pawl mechanism wherein the pawl normally coacts with one of the dials and at times coacts with the other dial, means for moving the pawl comprising a projection from the slide adjacent the left index thereof for actuation of the pawl when the left index registers with the hair line due to movement of the slide, or the hair line registers with the left index of the slide due to movement of the cursor, means operable by grasping the rider to reverse said pawl from its normal position to its position of coaction with said other dial, and means to render said ratchet and pawl mechanism inoperable during computations involving the use of the reciprocal scale of the slide rule.

7. In combination with a slide rule having a stator with scales, a slide with scales having end indices and a cursor with a hair line, a pair of dials carried by said cursor for indicating digits and zeros in the answer to a computation in conjunction with the formula $(D_n-Z_n)-(D_d-Z_d)$ wherein $D_n$ and $D_d$ designate for the answer the total number of digits to the left of the decimal point for those numbers greater than 1 in the numerator and denominator, respectively, and $Z_n$ and $Z_d$ designate the total number of zeros to the right of the decimal point in said numerator and denominator, and means for actuating said dials comprising ratchet and pawl mechanism for indexing said dials in a negative direction responsive to the left index of said slide registering with the hair line of the cursor and positively indexing them upon the hair line of the cursor registering with the left index of the slide.

8. In a slide rule, a stator having scales, a slide having scales provided with end indices, a cursor having a hair line, a pair of dials carried by said cursor for indicating digits and zeros in the answer to a computation in conjunction with the formula $(D_n-Z_n)-(D_d-Z_d)$ wherein $D_n$ and $D_d$ designate for the answer the total number of digits to the left of the decimal point for those numbers greater than 1 in the numerator and denominator, respectively, and $Z_n$ and $Z_d$ designate the total number of zeros to the right of the decimal point in said numerator and denominator, and ratchet and pawl mechanism for indexing said dials in a relatively negative direction responsive to the left index of said slide registering with the hair line of the cursor and positively indexing them upon the hair line of the cursor registering with the left index of the slide.

9. In a slide rule, a stator having scales, a slide having scales provided with end indices, a cursor having a hair line, a pair of dials carried by said cursor for indicating digits and zeros in the answer to a computation in conjunction with the formula $(D_n-Z_n)-(D_d-Z_d)$ wherein $D_n$ and $D_d$ designate for the answer the total number of digits to the left of the decimal point for those numbers greater than 1 in the numerator and denominator, respectively, and $Z_n$ and $Z_d$ designate the total number of zeros to the right of the decimal point in said numerator and denominator, and ratchet and pawl mechanism for indexing said dials in a relatively negative direction responsive to the left index of said slide registering with the hair line of the cursor and positively indexing them upon the hair line of the cursor registering with the left index of the slide, said ratchet and pawl mechanism being reversible to accomplish said positive indexing.

10. In a slide rule, a stator having scales, a slide having scales provided with end indices, a cursor having a hair line, a pair of dials carried by said cursor for indicating digits and zeros in the answer to a computation in conjunction with the formula $(D_n-Z_n)-(D_d-Z_d)$ wherein $D_n$ and $D_d$ designate for the answer the number of digits to the left of the decimal point for those numbers greater than 1 in the numerator and denominator, respectively, and $Z_n$ and $Z_d$ designate the number of zeros to the right of the decimal point in said numerator and denominator, and ratchet and pawl mechanism for indexing said dials in a relatively negative direction responsive to the left index of said slide registering with the hair line of the cursor and positively indexing them upon the hair line of the cursor registering with the left index of the slide, said ratchet and pawl mechanism being reversible to accomplish said positive indexing, and the means for reversing it comprising a normally locked locking means for said cursor relative to said stator, said locking means being releasable and said ratchet and pawl mechanism being simultaneously reversible by grasping the cursor.

ARTHUR FREDERICK ECKEL.

REFERENCES CITED

The following references are of record in the file of this patent:

UNITED STATES PATENTS

| Number | Name | Date |
| --- | --- | --- |
| 2,363,642 | Cherney | Nov. 28, 1944 |